United States Patent

Tesoro

[15] 3,682,975

[45] Aug. 8, 1972

[54] SUBSTITUTED SILYL GLYCIDYLAMINES

[72] Inventor: Giuliana C. Tesoro, Dobbs Ferry, N.Y.

[73] Assignee: J. P. Stevens & Co., Inc., New York, N.Y.

[22] Filed: May 13, 1968

[21] Appl. No.: 728,784

[52] U.S. Cl. ........260/348 SC, 161/193, 260/46.5 E, 260/348.6
[51] Int. Cl. .............................................C07f 7/18
[58] Field of Search ......................260/348 SI, 348.6

[56] References Cited

UNITED STATES PATENTS 3,215,648  11/1965  Duffy et al..................260/348
3,382,083  5/1968  Marsden et al..............106/98

FOREIGN PATENTS OR APPLICATIONS 554,639  7/1957  Belgium
185,921  12/1966  U.S.S.R.

Primary Examiner—Norma S. Milestone
Attorney—Kenyon and Kenyon Reilly Carr & Chapin

[57] ABSTRACT

This disclosure is directed to novel compounds which are silyl glycidylamines, to polymers of such compounds, and to glass fibers and laminates in which said compounds are used as sizing or bonding agents. The compounds of this disclosure are characterized by substituted silyl groups, preferably having at least one oxygen atom bonded thereto, wherein the silicon atom is bonded through a carbon atom to a nitrogen atom which in turn is bonded to an epoxy group. An example of these new compounds is N-(2,3-epoxypropyl)-N[3-(trimethoxysilyl)propyl]aniline:

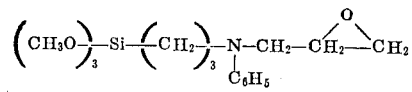

A method for their preparation is to react a silyl amine with an epihalohydrin, and to dehydrohalogenate the intermediate to form the compounds of this disclosure. These compounds may be applied as a size to glass fibers, and used as bonding agents for glass-resin laminates, particularly where the resin is an epoxy resin.

3 Claims, No Drawings

SUBSTITUTED SILYL GLYCIDYLAMINES

BACKGROUND

The application of sizing and bonding agents to glass fibers has long been an accepted procedure in the processing of such fibers into fabrics and laminates. The characteristics necessary for such agents have been extensively investigated and many different types of agents are commercially available. A demanding standard is required in view of the important functions which they serve in bonding the relatively smooth and inert glass surfaces. In view of the hydrophilic nature of the fibers, conventional bonding techniques are particularly susceptible to weakening by water. Thus there is a need for a size, and particularly a bonding agent for glass-resin laminates, which provides maximum strength upon extended exposure to water.

In the present invention these problems have been met by the development of novel silyl glycidylamines and the discovery that they are exceptional sizing agents for glass fibers and bonding agents for glass-resin laminates.

THE INVENTION

This invention relates to new organic compounds characterized by the presence of substituted silyl, amino and epoxy groups in the same molecule, to the preparation of such compounds, to polymers of such compounds, and to the use of such compounds for finishing glass and for improving the bonding of resins to glass. These novel compositions have utility, either by themselves or in combination with other compounds, as finishes for fibrous glass and as coupling agents for laminates made of thermosetting resins and fibrous glass, particularly when the fibrous glass is woven and in the form of multiple layers of glass fabric.

The novel compounds characterized by a silyl group bonded (directly or indirectly) through a carbon atom to nitrogen, and an epoxy group bonded to said nitrogen through a carbon atom, may be termed silyl epoxyalkylamines. Where said compounds are further characterized by a hydrocarbon group bonded through an oxygen atom to the silicon of said silyl group, they may be termed hydrocarbyloxysilyl epoxyalkylamines. The novel compounds of this invention have the generic formula:

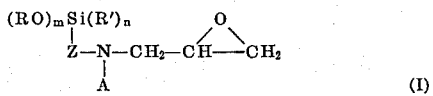

wherein
A is selected from the group consisting of hydrogen, alkyl, aryl, alkaryl and aralkyl;
m is an integer from 0 to 3;
n equals the quantity $(3-m)$;
each R and R' is selected independently from the group consisting of alkyl, alkoxyalkyl, aryl, alkaryl, and aralkyl; and
Z is a divalent organic radical selected from the group consisting of:
1. at least one methylene group;
2. at least one alkyl-substituted methylene group;
3. combinations of groups (1) and (2); and
4. combinations of groups (1), (2) and (3) interrupted by a member selected from the class consisting of ether oxygen, thioether sulfur, secondary amino nitrogen, and tertiary amino nitrogen.

These novel compounds may be further defined by the generic formula:

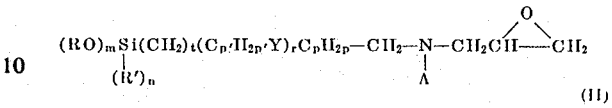

wherein
A is selected from the group consisting of hydrogen, aklyl, aryl, alkaryl and aralkyl;
m and t are integers from 0–3;
n equals the quantity $(3-m)$;
p and p' are independently selected from integers from 0–10;
r is an integer from 0–5 and is 0 when p' is 0;
each R and R' is selected independently from the group consisting of alkyl, alkoxyalkyl, aryl, alkaryl, and aralkyl; and
Y is selected from the group consisting of —O—, —S—, and

where A' has the same definition as A.

These new compounds are characterized by a silicon atom (preferably having at least one oxygen bonded thereto) separated from an epoxy group by an amino nitrogen, with the amino nitrogen separated from the silicon atom by an organic divalent radical having one or more carbon atoms. In the above generic formulae, A may be hydrogen, alkyl, aryl and aralkyl, and R and R' may be alkyl, alkoxyalkyl, aryl, alkaryl, and aralkyl. Examples of these groups include: alkyl, having from one to 10 carbon atoms, such as methyl, ethyl, propyl, butyl, octyl and nonyl; alkoxyalkyl, wherein the alkoxy and alkyl groups have one to six carbon atoms, such as ethoxyethyl, and methoxybutyl; aryl such as phenyl, anthracyl, and naphthyl; and aralkyl and alkaryl which include the above aryl radicals substituted with one or more lower alkyl groups or an alkylene group having one to six carbon atoms such as tolyl and phenylethyl.

In the divalent organic radical, wherein r, t and p are zero, the silicon atom is separated from nitrogen of the glycidylamine group by a methylene group. When r is zero and p is from zero to 10 the divalent organic radical may be a straight chain group such as trimethylene and hexamethylene, or a branched group such as 2-methyltrimethylene and 2,5-dimethyl-hexamethylene. When r has a value of at least one the divalent organic radical contains hetero atoms which can be illustrated by a number of species, such as:

—CH₂CH₂SCH₂CH₂b—; —CH₂CH₂CH₂OCH₂CH₂—;

—CH₂CH(CH₃)CH₂N(CH₂)₂—; and
    |
    H

—CH₂CH₂CH₂N(CH₃)CH₂CH₂N(CH₃)CH₂—

A preferred class of compounds of the generic formulae given above is

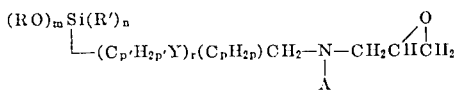

$$\text{(III)}$$

wherein

A is selected from the group consisting of hydrogen, alkyl groups having one to five carbon atoms, alkylphenyl, such as tolyl, xylyl and cumenyl, and phenalkyl such as benzyl and phenethyl;

$m$ is an integer from 1 to 3;

$n$ equals the quantity $(3-m)$;

$r$ is 0–1;

$p$ and $p'$ are 0–10;

each R and R' is selected independently from the group consisting of: alkyl groups having one to five carbon atoms, alkoxyalkyl groups wherein the alkyl and alkoxy groups have one to five carbon atoms; phenyl; phenalkyl groups and alkylphenyl groups wherein the alkyl portions have one to three carbon atoms; and Y is selected from the group consisting of ether oxygen, thioether sulfur, secondary amino nitrogen, and tertiary amino nitrogen having a substituent with one to six carbon atoms.

In addition to the silyl glycidylamines defined above, this invention embraces polymeric compounds derived from them. Polymers of the present invention can be formed by reaction of two or more of the monomers at their substituted silyl groupings.

Where $m$ is 1, 2 or 3 in formula (I), dimer formation is possible when the compound is exposed to hydrolyzing conditions, as illustrated below, wherein $m$ is one.

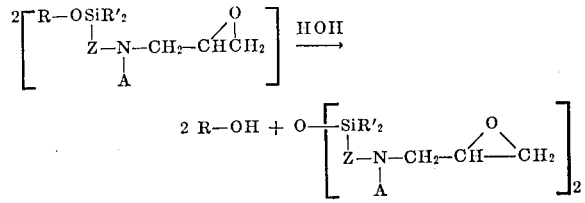

Hydrolysis is accelerated by using hot water or by using catalytic concentrations of acid or base. When $m$ is 2 or 3 in formula (I), higher polymers can result because of the multiciplicity of hydrolyzable bonds.

Substituted silyl glycidylamines of the above generic formulae can be prepared from substituted silyl amines of the primary or secondary type.

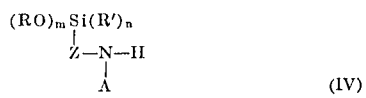

$$\text{(IV)}$$

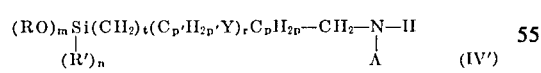

$$\text{(IV')}$$

by reaction with an epihalohydrin,

$$\text{(V)}$$

wherein X is Cl, Br, or I, and other symbols have the meanings given in connection with the above generic formulae.

A method of preparing the substituted silyl glycidylamines is illustrated as follows, wherein all symbols are as previously defined.

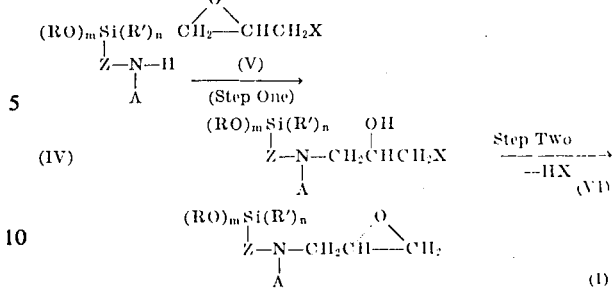

In Step One, the intermediate compound (VI), a substituted silyl 3-halo-2-hydroxyalkylamine, is formed by mixing a substituted silyl amine (IV) with an epihalohydrin (V), preferably moderately diluted by a solvent. The solvent should be inert with respect to the reactants and the product. Benzene, toluene, and xylene are examples of solvents for this process. Equimolar quantities of the starting materials are suitable for Step One; a slight excess of the epihalohydrin (V) is usually helpful when the starting amine (IV) is a secondary amine. A reaction temperature ranging from 10° to 30° C. is preferred, and generally the required period of time is from five days down to one or two days at the higher temperature. At the end of the reaction period, the solvent preferably should be removed by distillation at a moderate temperature and a low pressure.

In Step Two (dehydrohalogenation with ring closure), a strongly basic reagent is required. Suitable examples of strong bases are the resinous quaternary ammonium hydroxides. They are formed by the action of sodium hydroxide on the corresponding quaternary ammonium chlorides which are commercial ion-exchange resins. In such resinous quaternary ammonium compounds, ionic groups such as $-\text{N(alkyl)}_3\text{+Cl}^-$ or $-\text{N(alkyl)}_3\text{+OH}^-$, respectively, are appended to the backbone of the polymer. The reaction between such an ion-exchange resin in basic form and the intermediate (VI) occurs within a few minutes of mixing at room temperature. Preferably the intermediate (VI) should be dissolved in a lower alcohol, such as methanol. After completion of the reaction, the solvent is removed by distillation, preferably at a reduced pressure. The resulting substituted silyl glycidylamine is of a quality suitable for use as a finish for glass fibers, and as a bonding agent in glass-resin systems.

Representative starting amines containing substituted silyl groups are given in Tables I, II, and III.

TABLE I.

Starting Amines Conforming to Formula IV When A=H, and Z = $C_pH_{2p}$.

| Starting Primary Amine | R | R' | m | n | p |
|---|---|---|---|---|---|
| $(CH_3O-)_3Si(CH_2)_3NH_2$ | $CH_3$ | None | 3 | 0 | 3 |
| $(C_2H_5O-)_3Si(CH_2)_3NH_2$ | $C_2H_5$ | None | 3 | 0 | 3 |
| $(C_2H_5O-)_2SiCH_2CHCH_2NH_2$ <br> $\quad\quad\quad\quad\quad\ \ |\quad\ |$ <br> $\quad\quad\quad\quad\ \ CH_3\ \ CH_3$ | $C_2H_5$ | $CH_3$ | 2 | 1 | 4 |
| $(C_3H_7O-)_2Si(CH_2)_3NH_2$ <br> $\quad\quad\quad\quad\ |$ <br> $\quad\quad\quad\quad C_6H_5$ | $C_3H_7$ | $C_6H_5$ | 2 | 2 | 3 |
| $(C_6H_5)_2Si(CH_2)_3NH_2$ <br> $\quad\quad\ \ |$ <br> $\quad\quad OCH_3$ | $CH_3$ | $C_6H_5$ | 1 | 2 | 3 |

| | | | | |
|---|---|---|---|---|
| (C₆H₅)₃Si(CH₂)₃NH₂ | None | C₆H₅ | 0 | 3 3 |
| (C₂H₅O)(CH₃O)Si(CH₂)₃NH₂<br>  CH₃ | C₂H₅, CH₃ | CH₃ | 2 | 1 3 |

TABLE II.

Starting Amines Conforming to Formula IV When A=H, and When Z contains N, O, or S.

| Starting Amine | R | R' | m | n |
|---|---|---|---|---|
| (CH₃O—)₂SiCH₂CHCH₂N(CH₂)₂NH₂<br>   CH₃ CH₃ H | CH₃ | CH₃ | 2 | 1 |
| (CH₃O—)₃Si(CH₂)₃N(CH₂)₂NH₂<br>     H | CH₃ | None | 3 | 0 |
| (CH₃O-)₃SiCH₂CH₂SCH₂CH₂NH₂ | CH₃ | None | 3 | 0 |
| (CH₃O—)₃SiCHOCH₂CH₂NH₂<br>    CH₃ | CH₃ | None | 3 | 0 |
| (C₂H₅O—)₂Si(CH₂)₃N(CH₂)₂NH₂<br>   CH₃  C₂H₅ | C₂H₅ | CH₃ | 2 | 1 |

TABLE III.

Starting Secondary Amines Conforming to Formula IV, i.e., A = Alkyl, Aryl, Alkaryl, or Aralkyl

| Starting Secondary Amine | A | R | R' | m | n |
|---|---|---|---|---|---|
| (CH₃O—)₃Si(CH₂)₃NH<br>     C₆H₅ | C₆H₅ | CH₃ | None | 3 | 0 |
| (CH₃O—)₂Si(CH₂)₃NH<br>   C₆H₅  CH₃ | CH₃ | CH₃ | C₆H₅ | 2 | 1 |
| (CH₃O—)₂Si(CH₂)₃NH<br>   CH₃  C₂H₅ | C₂H₅ | CH₃ | CH₃ | 2 | 1 |
| (C₂H₅OCH₂CH₂—)₃Si(CH₂)₃NH<br>      CH₂C₆H₅ | Benzyl | None | Ethoxy-ethyl | 0 | 1 |
| (C₆H₅CH₂O—)₃SiCHSCH₂CH₂NH<br>    CH₃   C₆H₄CH₃ | Tolyl | Benzyl | None | 3 | 0 |
| (CH₃C₆H₄)₃SiCH₂CH₂CH₂O<br>CH₂CH₂NH<br>   C₄H₉ | C₄H₉ | None | Tolyl | 0 | 3 |
| (CH₃O—)₂SiCH₂CHCH₂N(CH₂)₂NHC₃H₇<br>   CH₃ CH₃  N  C₃H₇ | C₃H₇ | CH₃ | CH₃ | 2 | 1 |

Some of the starting amines listed in each of the foregoing three tables are available commercially. The remainder may be made by methods well known to those skilled in the art.

When the preparative method described above is used, the desired substituted silyl amine results by ring formation (involving dehydrohalogenation) of an intermediate compound (VI), namely a substituted silyl 3-halo-2-hydroxypropylamine. The over-all effect of the two-step process is that a glycidyl group replaces one hydrogen atom on the N atom in Formula IV. Inasmuch as each amine listed in Tables I, II, and III conforms to Formula IV for starting amines containing substituted silyl groups, replacement of one H of the terminal amino group in each compound in Tables I, II, and III by

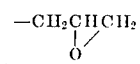

provides a representative list of specific products conforming to the generic formula (I).

The preferred members of the generic class (I) have one or more hydrolyzable groups, RO—, attached to the silicon atom, i.e., for hydrolyzability, m is one, 2 or 3. When m is one, 2, or 3, substituted silyl glycidylamines of this invention interact easily with hydroxyl-containing surfaces (e.g., glass and ceramic surfaces) to form finishes permanently bonded to the substrate. The chemical class of the hydroxyl-containing by-product resulting from such an interaction depends upon the classification of R. When R is alkyl, alkoxyalkyl, or aralkyl, the by-product ROH is an alcohol. If R is aryl, or alkaryl, then the by-product ROH is a phenol. In general, the by-products do not interfere with the use of substituted silyl glycidylamines with glass. Their ease of handling facilitates the use of the compounds of this invention for treatment of glass in many forms, e.g., fiber, fabric, sheet, film, powder, and paper made from glass.

RO-substituted silyl groups undergo hydrolysis and condensation to groupings which possess hydroxysilyl structures such as the following:

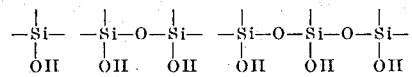

Similar functional structures characterize glass and ceramic surfaces. A finish of oxysilyl glycidylamine becomes chemically bonded to the hydroxyl-containing surface of the inorganic substrate through condensation reactions. Heating (e.g., as at 100° to 150° C. for one to five minutes) helps in the elimination of by-product ROH and water.

The hydrolyzable compounds of this invention may be copolymerized through the oxysilyl groups with hydroxyl-containing organic material to improve physical properties of the latter, e.g., moisture resistance, weatherability, thermal stability, and dielectric strength.

Substituted silyl glycidylamines are coupling agents in glass-resin systems because of multiple functionality, namely the silyl, amino, and the epoxy functions. Difficulties of making compounds possessing the set of those three functional groups have now been overcome by this invention.

The compounds of this invention form more desirable molecular bridges between organic resins and hydroxyl-containing substrates. Substituted silyl glycidylamines find use whenever strong, durable, water-resistant bonds are desired, and whenever the combination of epoxy, amino, and substituted silyl functions in the same compound is advantageous.

The novel compounds of the present invention are useful as finishes for glass, especially fibrous glass, and as bonding (or coupling) agents for improving strength and lasting qualities of selected resin composites reinforced by glass fibers. Several types of thermosetting resins are applicable for making such composites, namely epoxy resins and polyesters (particularly the unsaturated alkyd-styrene type).

In one composite type, namely the laminate type, superimposed layers of glass fabric previously finished with silicon-containing glycidylamines of the invention and impregnated with a liquid blend of thermosetting resin and hardener or catalyst are subjected to the application of heat and suitable pressure to form a dense, tough solid sheet. In addition to laminated sheets, other standard forms are slabs, rods, tubes and strips from which numerous commercial parts are obtained by sawing, punching, milling and machining. Thermoset resin compositions reinforced by glass fibers (woven as well as non-woven) of superior quality are useful in the production of vehicle bodies, boat hulls, naval structures, frames, load-bearing structural parts, storage tanks, non-metallic pipe, ducts, and boards for printed electrical circuits, and numerous other articles having tortuous shapes requiring high strength and resistance to impact.

The preparation and use of the compounds of this invention may be illustrated as follows:

EXAMPLE 1
Preparation of
N-(2,3-Epoxypropyl)-N-[3-trimethoxysilyl)propyl]aniline

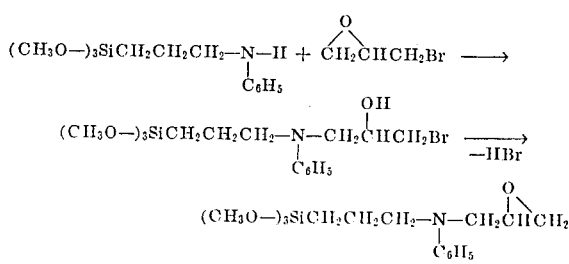

A solution containing 150 grams (1.09 moles) of epibromohydrin, 128 grams (0.50 mole) of N—[3-(trimethoxysilyl)-propyl]aniline, and 200 ml. of benzene was stirred at room temperature for three days. Then the solvent was distilled off under reduced pressure, leaving behind a viscous oil (214 grams), consisting mainly of N—(3-bromo-2-hydroxypropyl)—N—[3-(trimethoxysilyl)propyl]aniline. Analysis of that intermediate gave the following results: no ionic bromide, and an amine equivalent weight (by potentiometric titration with HBr in acetic acid) of 386 ($C_{15}H_{26}BrNO_4Si = 392.37$).

Next, the intermediate was dehydrobrominated to the desired substituted silyl glycidylamine. That was accomplished by stirring a solution of 180 grams (0.45 mole) of the intermediate in methanol for a few minutes at room temperature with 500 ml. of strongly basic ion-exchange resin in the form of beads. The functional structure of that high-capacity, high-porosity resin was that of a quaternary trimethylammonium hydroxide, $—N(CH_3)_3{+}OH^-$. It had been prepared from the corresponding chloride, $—N(CH_3)_3{+}Cl^-$, by treatment with aqueous sodium hydroxide, followed by separate washings with water and with methanol. The chloride form was a commercial grade, namely AMBERLITE IRA 402 of Rohm and Haas Company. It had a total anion exchange capacity of 1.35 milliequivalents per ml. of wet resin, and the effective diameters of its beads were 0.39 to 0.46 mm. After the brief period of stirring, the methanolic solution was decanted from the polymer. After the methanol had been distilled off at 30° to 40° C. under reduced pressure, the substituted silyl glycidylamine remained, 60 grams (0.19 mole) of N—(2,3-epoxypropyl)—N—[3-(trimethoxysilyl)-propyl]aniline. Titration by HBr in acetic acid showed an empirical equivalent weight of 143 ($C_{15}H_{25}NO_4Si = 311.45$, half of which is 155.7). The contaminant was some unreacted intermediate, confirmed by a small percentage of residual bound bromine.

EXAMPLES 2 – 8

Additional compounds of this invention are made by following the procedure of Example I with the exception that the following reactants are employed to give the indicated products.

TABLE IV

| Example | Starting reactants | Products |
|---|---|---|
| 2 | $(CH_3O)_3Si(CH_2)_3NH_2 + \overset{O}{\overset{\diagup\diagdown}{CH_2CHCH_2Br}}$ | $(CH_3O)_3Si(CH_2)_3\underset{H}{N}CH_2\overset{\diagup\diagdown}{\underset{O}{CHCH_2}}$ |
| 3 | $(CH_3O)_2\underset{CH_3}{\overset{\|}{Si}}CH_2\underset{CH_3}{\overset{\|}{CH}}CH_2N(CH_2)_2NH_2 + \overset{O}{\overset{\diagup\diagdown}{CH_2CHCH_2Br}}$ | $(CH_3O)_2Si—CH_2\underset{CH_3}{\overset{\|}{CH}}CH_2N(CH_2)_2\underset{H}{N}CH_2\overset{\diagup\diagdown}{\underset{O}{CHCH_2}}$ |
| 4 | $(CH_3O)_3Si(CH_2)_4\underset{C_6H_5}{\overset{\|}{N}}H + \overset{O}{\overset{\diagup\diagdown}{CH_2CHCH_2Br}}$ | $(CH_3O)_3Si(CH_2)_4NCH_2—\overset{\diagup\diagdown}{\underset{O}{CH—CH_2}}$ with $C_6H_5$ |
| 5 | $(C_3H_7O)_2Si(CH_2)_3NH_2 + \overset{O}{\overset{\diagup\diagdown}{CH_2CHCH_2Cl}}$ with $C_6H_5$ | $(C_3H_7O)_2Si(CH_2)_3—NCH_2\overset{\diagup\diagdown}{\underset{O}{CHCH_2}}$ with $C_6H_5$ |

Table IV—Continued

| Example | Starting reactants | Products |
|---|---|---|
| 6 | $(C_6H_5)_2Si(CH_2)_3NH_2 + \overset{O}{\overset{\diagup\diagdown}{CH_2CHCH_2}}Cl$ <br> $\quad\quad\quad\quad\quad\vert$ <br> $\quad\quad\quad\quad\quad OCH_3$ | $(C_6H_5)_2Si(CH_2)_3-N-CH_2CHCH_2$ <br> $\quad\quad\vert\quad\quad\quad\quad\vert\quad\quad\diagup\diagdown$ <br> $\quad\quad OCH_3\quad\quad H\quad\quad O$ |
| 7 | $(CH_3O)_3SiCH-OCH_2CH_2NH + \overset{O}{\overset{\diagup\diagdown}{CH_2CHCH_2}}Br$ <br> $\quad\quad\vert\quad\quad\quad\quad\quad\quad\vert$ <br> $\quad\quad CH_3\quad\quad\quad\quad\quad CH_3$ | $(CH_3O)_3Si-CHOCH_2CH_2N-CH_2CHCH_2$ <br> $\quad\quad\quad\quad\quad\vert\quad\quad\quad\quad\quad\vert\quad\quad\diagup\diagdown$ <br> $\quad\quad\quad\quad\quad CH_3\quad\quad\quad\quad CH_3\quad\quad O$ |
| 8 | $(C_6H_5CH_2O)_3Si-CHS\,CH_2CH_2NH + \overset{O}{\overset{\diagup\diagdown}{CH_2CHCH_2}}Br$ <br> $\quad\quad\quad\quad\quad\quad\vert\quad\quad\quad\quad\quad\quad\vert$ <br> $\quad\quad\quad\quad\quad\quad CH_3\quad\quad\quad\quad\quad\quad C_6H_4CH_3$ | $(C_6H_5CH_2O)_3SiCHS\,CH_2CH_2N-CH_2\overset{O}{\overset{\diagup\diagdown}{CHCH_2}}$ <br> $\quad\quad\quad\quad\quad\quad\vert\quad\quad\quad\quad\quad\quad\vert$ <br> $\quad\quad\quad\quad\quad\quad CH_3\quad\quad\quad\quad\quad C_6H_4CH_3$ |

EXAMPLE 9

Preparation of Resin-Glass Laminate Using the Product of Example 1 as the Bonding Agent and m-Phenylenediamine as the Curing Agent.

A glass fabric of a grade commonly used as a filter fabric, having a weight of 9 ounces per square yard and a thread count of 56 × 54 (warp × filling), was heat-cleaned at 355± 15° C. for 72 hours, then washed by a 0.1 percent aqueous solution of acetic acid, and finally rinsed by water and dried. The product prepared in Example 1, namely N—(2,3-epoxpropyl)—N—[3-(trimethoxysilyl)propyl]aniline, was made into a 1 percent solution in methanol and applied as a finish to the glass fabric by a padding operation. In the padding operation, the cloth, impregnated with the solution, was squeezed as it passed between two pad rolls. The finish, coupling agent, or bonding agent, was dried on the fabric by heating at approximately 120° C. for two minutes. The amount of the finish, a substituted silyl glycidylamine, on the glass fabric was of the order of 0.5 percent of the weight of the fabric.

An epoxy prepolymer, Epon 828, was selected for making a resin-glass laminate. That epoxy prepolymer is a thermosetting liquid sold by Shell Chemical Company, Plastics and Resin Division, for making commercial laminates. Epon 828 is predominantly 2,2-bis[p-(2,3-epoxypropyl)phenyl])propane (molecular weight, 340), along with some closely related, higher-molecular-weight compounds also derived from glycidyl ethers of p,p'-isopropylidenediphenol, so the over-all average molecular weight is approximately 380. Specifications call for one gram equivalent of epoxide per 188 ± 4 grams of resin, and a viscosity of 130 ± 30 poises at 25° C.

The hardener or curing agent for the epoxy prepolymer was m-phenylenediamine. In order to prepare a blend of epoxy prepolymer and hardener in the standard ratio of 100:14.5 parts by weight, the following mixing procedure was used. To 14.5 parts of the prepolymer heated to 65° C. was added an equal weight of molten hardener (also at 65° C.), and the hot mixture was blended thoroughly with 85.5 parts of additional prepolymer at room temperature. The glass fabric was impregnated with the freshly prepared prepolymer-hardener blend by a wet lay-up procedure wherein the plies of fabric were laid upon each other and wetted with the liquid prepolymer.

To prepare for the wet lay-up, glass fabric having the substituted silyl glycidylamine on it was cut into 12.5-by-16-inch rectangles. These pieces were stacked, 6 at a time, with warp yarns parallel, on a bag that would subsequently seal in molten components during the pressing operation soon to follow. The bag was made of polyester film, specifically from ethylene glycol terephthalate polymer.

The lay-up was assembled on a plate heated to about 50° C. to make the prepolymer-hardener blend less viscous, thereby facilitating impregnation of the plies of fabric. A pool of freshly prepared prepolymer-hardener blend surrounded the stacked plies of glass fabric. The remaining plies (12 in all) were added to the stack, and more prepolymer-hardener blend was applied until all stacked plies were saturated. Just prior to sealing the bag holding the full stack of saturated plies, excess fluids (including entrapped air) was squeezed out by applying a rolling pin.

The bubble-free system of prepolymer-hardener and glass finished with the coupling agent was closed in the bag, which was then placed in a hot laminating press with 0.12-inch-thick shims to maintain that thickness. The press, initially at 93° C. was held at that temperature for 30 minutes, then kept at 120° C. for 35 minutes and finally heated to 150° C. for 35 minutes to cure the thermosetting composition. Immediately thereafter, cool water was circulated through tubes in the top and bottom platens to cool them and the laminate in order to prevent hot-warping.

Specimens of the laminates suitable for evaluation on an Instron strength testing machine were made by sawing them into 0.5-by-4-inch rectangles and machining them to dimensions necessary to subject them to the following tests:

| | |
|---|---|
| Flexural Strength: | ASTM Test Method D790–59T. |
| Compressive Strength: | ASTM Test Method D695–61T. |
| Tensile Strength: | ASTM Test Method D638–61T. |

Five specimens were tested directly as a set without having been exposed to the destructive action of water. Five others were immersed in boiling water for two hours, and five more were kept in boiling water for 72 hours. (Note on Accelerated Test in Water. Immersion in boiling water for 72 hours is roughly equivalent to immersion in water at 20° C. for around three years with respect to its weakening effect on strength values of a laminate. The 72-hour boil is a much more rigorous test than the two-hour boil. The latter approximates the effects of a month in water at 20° C. Immersion in boiling water is used as an accelerated method for assessing the permanence of laminates as measured by strength properties. The latter, in turn, are dependent on the degree of bonding, among other factors, between glass and resin. By not varying the other factors, the relative effectiveness of bonding agents can be rated in a series of laminates made with other factors kept constant. The data obtained are in Table V which also includes data based on the following Example 10. They clearly attest to the usefulness of this oxysilyl glycidylamine as a bonding agent in a glass-resin system.) All specimens were wiped dry before strength properties were measured.

Useful laminates are also prepared by substituting the products of Examples 2 through 8 for N-(2,3-epoxypropyl)-N-[3-(trimethoxysilyl)propyl]aniline and by otherwise following the procedure for the preparation of these laminates as set forth in Example 9.

EXAMPLE 10
Preparation of a Reference Laminate Using 3-(2,3 Epoxypropoxy)-propyl-trimethoxy-silane as the Bonding Agent The same type of glass fabric used in Example 9 was heat-cleaned, washed, and rinsed as described in that example. In order to have a reference laminate to use as a standard for comparison, a widely accepted commercial bonding agent, namely 3-(2,3-epoxypropoxy)propyl-trimethoxy-silane:

was used in place of the substituted silyl glycidylamine of Example 9. It was padded on the glass fabric as a 1 percent dispersion in water adjusted to pH 3.5 ± 0.5 by acetic acid. In other respects, the procedure was that of Example 9. That is, values of concentrations, ratios, heating conditions, and dimensions were identical with those of Example 9, as were the names of the other ingredients. The results are in Table V.

As shown by values of flexural strength, the silyl glycidylamine of Example 9 was superior in effectiveness to the commercial bonding agent of Example 10 used as a standard of reference or comparison.

TABLE V

| Bonding agent (See legend) | Substituted silyl glycidyl-amine | Commercial standard for comparison |
|---|---|---|
| Example number | 9 | 10. |
| Solvent used in padding | Methanol | Water. |
| Number of plies of glass cloth | 12 plies | 12 plies. |
| Thickness of laminate | 0.121 inch | 0.120 inch. |
| Content of Epon 828/m-phenylenediamine | 36.0 percent | 35.1 percent. |
| Flexural strength: | | |
| Unexposed to water | 87,900 p.s.i. | 83,100 p.s.i. |
| After 2-hour boil | 85,100 p.s.i. | 80,100 p.s.i. |
| After 72-hour boil | 73,500 p.s.i. | 67,100 p.s.i. |
| Compressive strength: | | |
| Unexposed to water | 56,800 p.s.i. | Untested. |
| After 2-hour boil | 53,800 p.s.i. | Do. |
| After 72-hour boil | 48,300 p.s.i. | Do. |
| Tensile strength: | | |
| Unexposed to water | 59,700 p.s.i. | Do. |
| After 2-hour boil | 55,700 p.s.i. | Do. |
| After 72-hour boil | 47,600 p.s.i. | Do. |

Legend of bonding agents.—Example 9: N-(2,3-epoxypropyl)-N-[3-(trimethoxysilyl)propyl]aniline. Example 10: 3-(2,3-epoxypropoxy)propyl-trimethoxy-silane.

EXAMPLE 11
Variation of Example 9 Using Methyl-cis-5-norbornene-2,3-dicarboxylic Anhydride (NMA) as the Curing Agent Example 9 was repeated with the variation that m-phenylenediamine was replaced by a liquid curing agent or hardener, namely methyl-cis-5-norbornene-2,3-dicarboxylic anhydride, $C_{10}H_{10}O_3$, commonly called methyl-NADIC anhydride, and referred to herein as NMA. Furthermore, instead of 14.5 parts of curing agent per 100 parts of epoxy prepolymer (Epon 828), the ratio was 455 parts of NMA and three parts of benzyldimethylamine (accelerator) per 500 parts of epoxy prepolymer (all parts by weight). Because the ingredients were liquids, no heating was required in order to blend them. Table VI summarizes the conditions and results, and is further evidence of the excellent bonding obtained in accordance with the present invention.

TABLE VI

Bonding Agent: The substituted silyl glycidylamine of Example 9.

| | |
|---|---|
| Solvent Used in Padding: | Methanol. |
| Number of Plies of Glass Cloth: | 12 plies. |
| Thickness of Laminate: | 0.116 inch. |
| Content of Epon 828/NMA | 35.7% |
| FLEXURAL STRENGTH | |
| Unexposed to Water: | 93,100 psi. |
| After 2-Hour Boil: | 65,999 psi. |
| COMPRESSIVE STRENGTH | |
| Unexposed to Water: | 56,400 psi. |
| After 2-Hour Boil: | 40,000 psi. |
| TENSILE STRENGTH | |
| Unexposed to Water: | 57,000 psi. |
| After 2-Hour Boil: | 52,000 psi. |

The invention has been described in terms of specific embodiments set forth in detail. Alternative embodiments will be apparent to those skilled in the art in view of this disclosure, and accordingly such modifications are to be contemplated within the spirit of the invention as disclosed and claimed herein.

What is claimed:

1. Compounds having the formula

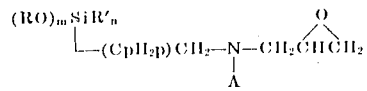

wherein
A is selected from the group consisting of hydrogen, alkyl groups having one to five carbon atoms, alkylphenyl, and phenalkyl;
m is 3;
n equals the quantity (3 − m);
p is an integer from 2 to 3;
each R and R' is selected independently from the group consisting of alkyl groups having one to five carbon atoms, alkoxyalkyl groups wherein the alkyl and alkoxy groups have one to five carbon atoms phenyl; phenalkyl groups and alkylphenyl groups wherein the alkyl portions have one to three carbon atoms.

2. Compounds according to claim 1 having the formulae:

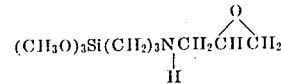

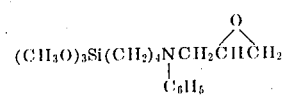

3. A compound having the formula

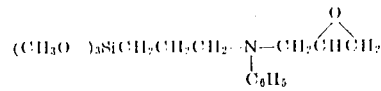

* * * * *

UNITED STATES PATENT OFFICE
CERTIFICATE OF CORRECTION

Patent No. 3,682,975      Dated August 8, 1972

Inventor(s) Giuliana C. Tesoro

It is certified that error appears in the above-identified patent and that said Letters Patent are hereby corrected as shown below:

In the Abstract, that portion of the formula reading

Column 2, line 60, that portion of the formula reading
$CH_2b-$ should read $CH_2-$ Column 2, line 62, the formula on this line should be in type as large as the formulae directly above and below it, not smaller.

Column 4, Table 1, the fourth numeral under the heading n, delete "2" and substitute --1--

Column 5, Table III, the sixth formula under the heading Starting Secondary Amine, that portion reading
$CH_2O$ should read $CH_2O-$ Column 5, Table III, the seventh formula under the heading Starting Secondary Amine, that portion reading
$(CH_2O-)_2SiCH_2$ should read $(CH_2O-)_2-SiCH_2$
            |                        |
           $CH_3$                     $CH_3$ Column 7, line 36, that portion reading
[3-trimethoxysilyl)propyl]a   should read
[3-(trimethoxysilyl)propyl]-

Column 7, line 37, delete "niline" and substitute --aniline--

Signed and sealed this 20th day of March 1973.

(SEAL)
Attest:

EDWARD M. FLETCHER, JR.          ROBERT GOTTSCHALK
Attesting Officer                    Commissioner of Patents